April 14, 1953 A. V. BEDFORD 2,635,141

COLOR TELEVISION RECEIVER REGISTRATION SYSTEM

Filed Nov. 30, 1949

INVENTOR
Alda V. Bedford
BY
[signature]
ATTORNEY

Patented Apr. 14, 1953 2,635,141

UNITED STATES PATENT OFFICE 2,635,141

COLOR TELEVISION RECEIVER REGISTRATION SYSTEM

Alda V. Bedford, Princeton, N. J., assignor to Radio Corporation of America, a corporation of Delaware Application November 30, 1949, Serial No. 130,204

1 Claim. (Cl. 178—5.4)

This invention relates to improvements in color television receivers of the type in which different component colors are multiplexed and, in particular, to the circuits that control the multiplexing.

In color television receivers of the type noted above the electron beam scans repeated groups of different color responsive phosphors. These groups are arranged in strips that are in one form of the invention at right angles to the horizontal scanning action. Means are provided for controlling the intensity of the beam by video signals that successively represent the variations in intensity of the different component colors. In order to synchronize the application of the video signals to the intensity control electrode with the position of the beam on the screen, an optical filter that passes light of any one of the component colors is inserted between the viewing screen and a photoelectric cell so that every time the beam traverses the phosphor that emits that particular color light, a signal is developed. This derived signal is then applied to a delay line. The application of the video signals to the control grid of the kinescope is then controlled by gating tubes in the video circuits operated from pick ups located at different points in the delay line. Such an arrangement is shown and described in detail in the co-pending U. S. application of Paul K. Weimer, Serial No. 5,431 filed January 30, 1948, now Patent No. 2,545,325 granted March 13, 1951.

In such a system, however, the amplitude of the control signals derived by the photoelectric cell will vary.

In accordance with one aspect of this invention, the keying of the gating tubes is made more accurate by maintaining the signals derived by the photoelectric cell at a constant amplitude. The reason why this provides more accuracy is that the pulses applied to the gating tubes have a constant slope so that triggering occurs at a fixed time with respect to the peak of the pulse.

In accordance with another aspect of this invention, the delay line is supplanted with a chain of multivibrators, each gating circuit being controlled by the output of one of the multivibrators. It is well known to those skilled in the art that the phase of the output signal provided by a multivibrator may be substantially changed by altering the amplitude of the triggering signal and therefore the provision of triggering signals of constant amplitude improves the operation of the combination in this respect.

For reasons that will become apparent from the detailed considerations below, an automatic gain control circuit of the standard type cannot be used to perform the function of providing triggering signals of constant amplitude, and therefore a special circuit arrangement is provided.

One of the primary objects of this invention is to provide an improved color image reproducing system of the type in which the component colors are sequentially formed and in which the phase of the change from one color to the other and the duration of any given color is more suitable.

Another object of the invention is to provide a gain control circuit that may be employed to provide triggering signals of constant amplitude in a color television system in which the video signals sequentially represent the intensities of the component colors, the triggering signals being derived from the reproduction of a given color in the receiver.

These and other objects will become apparent from a detailed description of the drawings in which.

Figure 1:
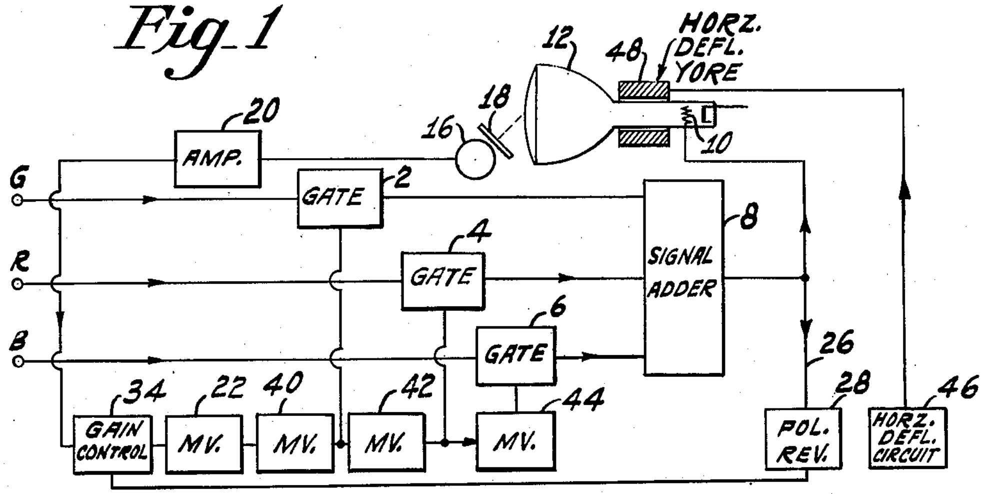
Figure 1 is a block diagram of a color television receiver that is adapted to reproduce colored images in accordance with this invention.
Figures 2, 3:
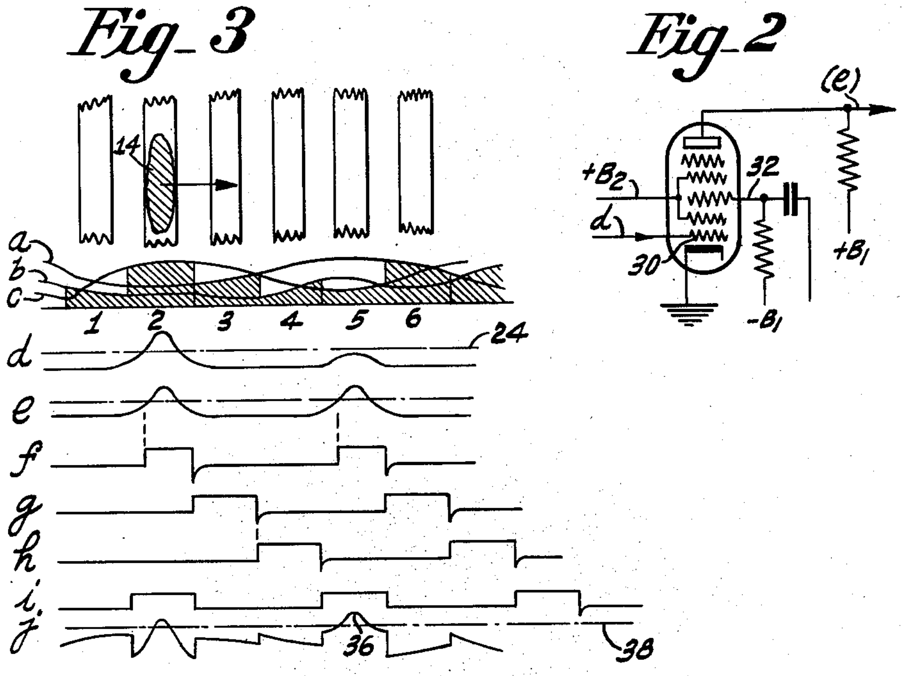
Figure 2 illustrates by circuit diagram a gain control arrangement suitable for providing triggering pulses of constant amplitude in the arrangement shown in Figure 1.
Figure 3 illustrates a section of the target employed in the cathode ray tube of Figure 1, as well as the wave forms present at various points in the circuit.

Referring in detail to Figure 1, the signals applied simultaneously to the terminals G, R and B are shown as waves *a*, *b*, *c* in Figure 3 and correspond to the variations in intensity of the green, red and blue component colors in the image to be reproduced. These signals are respectively applied to the gating circuits 2, 4 and 6 which may be multigrid switches such as illustrated on page 379 of the book entitled "Waveforms" published by the McGraw Hill Book Company, 1949 for the Massachusetts Institute of Technology. The gating circuits 2, 4 and 6 permit only one of the video signals at a time to pass through the mixer, or signal adder, 8 which may be comprised of a series of amplifiers having a common plate load impedance to the control grid 10 of cathode ray tube 12.

The target employed in the tube 12 and illustrated in part at the top of Figure 3 has alternate vertical strips coated with phosphors that emit green, red and blue light when struck by an electron beam. A picture element may include a set of three such strips, but the spot is small enough to engage only one small trip at a time.

During selected intervals different signals are applied to the control grid 10, as illustrated by the shaded areas 1 through 6 in Figure 3. The heights of the areas 3 and 6 are proportional to the green wave (*a*) for the times that the scanning spot is upon the green strips. Similarly, the areas 2 and 5 correspond to the blue signal and the areas 1 and 4 correspond to the red signals. The signal reaching the kinescope grid 10 is shown by the line which runs along the upper edges of the shaded areas.

The phototube 16 in Figure 1 receives only blue light from the face of the kinescope because of the blue filter 18. Therefore, the signal produced by the phototube 16 and amplified by the amplifier 20 is similar to waveform D in Figure 3 which has a peak for each time the scanning spot is in the center of the blue emitting phosphor. These pulses trigger multivibrator 22. However, the pulses vary in height because of the variations in brightness in the color of picture at the different areas. Thus, if the multivibrator 22 were set to trigger at a level such as indicated by the line 24 in waveform D, some pulses might not cause triggering. If the trigger level were made still lower, triggering would occur at each pulse but the phase would vary, and therefore the signal applied to the grid would not correspond with the position of the scanning spot with respect to the color strip. In addition, noise might cause spurious triggering.

Therefore, in accordance with this invention, a special volume control circuit is employed for keeping the pulses of the wave substantially constant, as illustrated in waveform E. This cannot be an automatic volume control of the conventional type as used in radio receivers because the wave D does not in itself contain information or properties to which the automatic volume control could respond in adequate time. The usual automatic volume control responds relatively slowly to hold the mean height of a series of peaks at a fairly constant value. If a single peak is substantially lower than those peaks immediately preceding it, the standard AVC circuit would not bring it up to a fixed predetermined value. However, if the peaks continue to be low for many intervals, the automatic volume control will gradually adjust itself to make their average value come up to the previous average value. In this color receiver, however, it is required that each pulse have the same predetermined amplitude for reasons given above.

The special volume control arrangement is activated not by the signal D, which is to be controlled, but by the reversed signal 1, 2, 3, 4, 5, 6 of the wave shown in Figure 3 which is applied to the grid 10 of the kinescope 12 and is therefore the source of the variation of the pulses of waveform D in the first place. The conductor 26 applies a control signal to the volume control after it has passed through a polarity reversing unit 28 which is comprised of an odd number of stages of amplification.

The volume control may be of the type illustrated in Figure 2 which comprises a single five-grid tube 29 of the type used as a pentagrid converter in radio receiver circuits. This tube has the property of decreasing the amplification factor of the first grid 30 when the voltage of the third grid 32 is made more negative. Therefore, when the kinescope signal swings more positive, increasing the light output and increasing the peak height of wave D, there is more negative voltage applied to the third grid 32 of the pentagrid tube 29 which immediately reduces its amplification and tends to keep the peaks of wave D at a constant value. In the block diagram of Figure 1 the tube is indicated by the block 34.

As an alternative, a balanced modulator of the type shown in "Radio Engineering" by Terman, page 415 may be employed in order to prevent any of the control signal from reaching the output and thereby appearing in the gating circuits so as to lessen their accuracy.

However, a reasonable amount of the control signal may be permitted in the output signal if it is in the right direction as occurs in the single tube circuit of Figure 2. The output of this tube would be like waveform J of Figure 3 which is composed of the wave 1, 2, 3, 4, 5, 6 and another wave like wave D except that the pulses have more nearly equal amplitudes because of the changes in gain brought about by changes in the "mu" of the tube. In this case, it can be seen that the lower amplitude pulse 36 is elevated due to the video signal during interval 5 of the component provided by the signal in lead 26. Accurate triggering of multivibrator 22 at the level of the line 38 can be obtained from this type of wave.

The waveform F is produced by a multivibrator 22 which may be of the type described on page 168 of the "Waveforms" publication. The negative pip or swing of this waveform occurring at the trailing edge of the pulse is employed to trigger the multivibrator 40 after a predetermined interval of time, the output of multivibrator 40 being indicated by the waveform G of Figure 3. When this waveform is applied to the gating circuit 2, green video signals are permitted to pass from the signal adder 8 and thence to the control grid 10 of the kinescope 12. In a similar fashion the negative pip appearing at the output of multivibrator 40 triggers multivibrator 42 and the waveform H thereby developed is applied to the gate circuit 4 so that the red video signals are permitted to pass to the control grid 10. Likewise, the negative pip supplied by multivibrator 42 triggers multivibrator 44 and the waveform I thus developed is applied to the gating circuit 36 so that the blue video signals are applied to control grid 10.

A source of deflection voltage waves 46 supplies current to the horizontal and vertical deflection yokes 48 in a manner well known to those skilled in the art.

Having thus described my invention, what is claimed is:

A television receiver that is adapted to reproduce images in color from a plurality of video voltage waves each of which represents a different component color comprising in combination a source of said voltage waves having separate output for the voltage wave corresponding to the intensity variations of a given component color, an adder for combining signals, a plurality of normally closed keyers, each of which is connected between said adder and one of said separate outputs, a cathode ray tube having means for projecting a beam of electrons, a grid adapted to control the intensity of said beam of electrons, the output of said adder being connected to said grid, a target mounted within said cathode ray tube having a plurality of different color fluorescent phosphors mounted thereon, means adapted to cause said beam to scan said target, a photoelectric cell positioned so as to receive light emitted by said phosphors, an optical filter adapted to pass light of a single component color mounted between said phosphors and said photoelectric cell, an electronic amplifier having a plurality of grids, the nature of said amplifier being such that a change in the voltage applied to a first grid changes the gain of a second grid, polarity reversing means connected to receive the output of said adder, the output of said polarity reversing means being applied to said first grid, the signals derived by said photoelectric cell being applied to said second grid, the output of said electronic amplifier being applied to the first of a series of multivibrators, each of said keyers being connected to receive the output of a different one of said multivibrators.

ALDA V. BEDFORD.

References Cited in the file of this patent

UNITED STATES PATENTS

| Number | Name | Date |
|---|---|---|
| 1,814,987 | Weaver | July 14, 1931 |
| 2,415,059 | Zworykin | Jan. 28, 1947 |
| 2,476,698 | Clapp | July 19, 1949 |
| 2,492,926 | Valensi | Dec. 27, 1949 |
| 2,530,275 | Weingarten | Nov. 14, 1950 |
| 2,544,325 | Weimer | Mar. 13, 1951 |

FOREIGN PATENTS

| Number | Country | Date |
|---|---|---|
| 524,672 | Great Britain | Aug. 12, 1940 |